United States Patent [19]

Earl et al.

[11] Patent Number: 4,509,598

[45] Date of Patent: Apr. 9, 1985

[54] FRACTURING FLUIDS CONTAINING BOUYANT INORGANIC DIVERTING AGENT AND METHOD OF USE IN HYDRAULIC FRACTURING OF SUBTERRANEAN FORMATIONS

[75] Inventors: Robert B. Earl; David B. Larson; Huy X. Nguyen, all of Tulsa County, Okla.

[73] Assignee: The Dow Chemical Company, Midland, Mich.

[21] Appl. No.: 478,933

[22] Filed: Mar. 25, 1983

[51] Int. Cl.³ .............................................. E21B 43/26
[52] U.S. Cl. .................................... 166/308; 166/281; 166/283
[58] Field of Search ................ 166/280, 281, 308, 283

[56] References Cited

U.S. PATENT DOCUMENTS

| | | |
|---|---|---|
| 3,127,937 | 4/1964 | McGuire, Jr. et al. ........ 166/281 X |
| 3,399,727 | 9/1968 | Graham et al. ...................... 166/280 |
| 3,417,821 | 12/1968 | Tinsley et al. ....................... 166/283 |
| 3,431,977 | 3/1969 | Fast et al. ............................. 166/281 |
| 3,497,008 | 2/1970 | Graham et al. ...................... 166/280 |
| 3,500,929 | 3/1970 | Eilers et al. ......................... 166/308 |
| 3,954,142 | 5/1976 | Broaddus et al. .............. 166/308 X |

Primary Examiner—Stephen J. Novosad
Assistant Examiner—Bruce M. Kisliuk

[57] ABSTRACT

The growth of upward vertical fractures during a hydraulic fracturing process is inhibited or prevented by (1) initiating the fracture with a first fluid which is a pad fluid, and (2) extending the fracture with a second fluid comprising a carrier fluid and a bouyant inorganic diverting agent. The second fluid is preferably pumped at a minimum rate to extend the fracture and carry the diverting agent without screening out. After the diverting agent is implaced, a viscous pad fluid and fracture fluid are subsequently pumped at treatment rates and pressures to complete the fracturing process.

13 Claims, No Drawings

FRACTURING FLUIDS CONTAINING BOUYANT INORGANIC DIVERTING AGENT AND METHOD OF USE IN HYDRAULIC FRACTURING OF SUBTERRANEAN FORMATIONS

BACKGROUND

1. Field of the Invention

This invention pertains to certain compositions of matter and the use of such compositions in the hydraulic fracturing of subterranean formations penetrated by a borehole (wellbore). More specifically, this invention relates to compositions of matter and a method of controlling the direction of growth of fractures created during hydraulic fracturing.

2. State of the Art

Hydraulic fracturing is a well known stimulation technique used to recover formation fluids (e.g. oil and gas) from subterranean formations. In hydraulic fracturing, a fracturing fluid is injected through a wellbore to the formation to be treated at a rate and pressure at least sufficient to initiate and/or extend a fracture into the formation. Generally, a "pad fluid" is injected initially to establish formation breakdown (i.e., to initiate the fracture) and injectivity. The fracturing fluid usually carries a proppant into the fracture to hold the fracture open once the external pumping pressure is relieved. The physical requirements placed on the pad fluid and the subsequent fracturing fluid are, in many instances, different and the fluids are optimized according to their intended function.

The fracture(s) created during hydraulic fracturing can take different configurations and orientations, relative to the wellbore. Even though considerable information is available to the service company engineer designing the fracturing treatment from well logging, field experience, and core analysis, most attempts to control the fracture have been limited to a selection of the zone to be fractured, the point of injection into the zone, and selection of the treatment fluid and pump rates. This results in a fracture geometry determined primarily by the prevailing geologic stresses in the formation treated, supplemented by the inherent strength of the formation and its composite make-up. If the operator is fortunate the fracture proceeds horizontally within the pay zone. In many instances, however, the fracture proceeds vertically.

It is desirable to limit and control the extent of vertical fractures. Unless vertical fractures are limited and controlled, there is a possibility of fracturing out of the pay zone and into a barren zone or into a zone bearing undesirable fluids (e.g. water or brine) which could cause formation damage and contamination of fluids in each zone. In addition, fracturing fluids consumed in initiating and/or extending such unwanted vertical fractures are wasted.

There have been some prior attempts to control fracture geometry and/or to limit vertical fractures. For example, Hanson et al. (U.S. Pat. No. 3,151,678) described a fracturing process in which various rates of injection were used and the proppant in the fluid acted both as a proppant to prevent closure and as a semipermeable plug which closed off paths of least resistance. Hanson (U.S. Pat. No. 3,159,217) also attempted to achieve more effective fractures by including in the fracturing fluid certain solid plastically deformable charges or slugs having a density equal to or different from the treatment fluid. Hanson said the density of such charges could be increased by adding heavier weighting materials (e.g. $BaSO_4$ and $Fe_2O_3$) or decreased by adding lighter weighting materials (e.g. cellulose or small hollow bodies, i.e., glass beads). In an attempt to control the direction of the vertical fracture up or down, Prater (U.S. Pat. No. 3,372,752) simultaneously injected two or more fracturing fluids of different densities along with a proppant that matched the density of one of the fluids, e.g., water, and a light oil containing aerated glass beads having a specific gravity of about 0.7 (column 3, lines 3–19). Ceramics having internal voids was described by Harold L. Graham and Othar M. Kiel (U.S. Pat. No. 3,399,727) as a proppant suitable for partial monolayer propping in fracturing treatment. Included under the term ceramics were particles of glass, porcelain, or alumina containing gas bubbles.

Braunlich (U.S. Pat. No. 3,335,797) taught a method for controlling the downward growth of a vertical fracture by a multiple step fracturing process which selectively placed a heavy proppant in the lower portion of a fracture and diverted subsequent fluids upwardly and horizontally. The concept of "similarly" preventing upward growth of vertical fractures using a bouyant material instead of the heavy proppant has been a topic of primary academic concern. See, for example, SPE 9260 (1980); SPE/DOE 11637 (1983); and seminar paper SPE/DOE 11606 (1983) presented by J. D. McLennan et al.

SUMMARY OF THE INVENTION

An improvement in the method of hydraulically fracturing a subterranean formation has now been discovered. The improvement comprises: (1) initiating the fracture with a first fluid, and (2) extending the fracture with a second fluid comprising a carrier fluid and an inert, bouyant, inorganic, diverting agent in an amount sufficient to inhibit or prevent the growth of an upward vertical fracture. The second fluid, which is a new composition of matter, is injected through the wellbore and into the formation at a rate and pressure high enough to extend the fracture and to carry the diverting agent into the fracture without screening out, but low enough to permit the diverting agent to accumulate in the upper portion of the fracture and form a compacted barrier zone which is capable of diverting subsequently injected fluids downwardly and horizontally. The diverting agent has a specific gravity less than the carrier fluid and it is bouyant in the second fluid; because of this property, it forms the compacted barrier zone within a short period of time. However, as added assurance that adequate time has been provided for the diverting agent to migrate upwardly in the fracture and form the compacted barrier zone, a compatible third fluid is preferably injected immediately after the second fluid in the fracturing process at a rate and pressure to accomplish the intended result. Usually, the injection rate and pressure is chosen to be essentially the same for the second and third fluids as a matter of operating convenience. The fracturing process is then continued by subsequently injecting a viscous pad fluid and a proppant-bearing or acid fracturing fluid at fracture rates and pressure to extend the fracture.

The novel process is most effective in fracturing pay zones bounded by formations having in situ stresses less than or essentially the same as the pay zone. One method of determining such stress contrasts is by creating one or more micro-hydraulic fractures in the pay zone and in the bounding formations. In creating these micro-hydraulic fractures, a minimum amount (e.g. 50 gallons) of hydraulic fluid is injected at low rates until formation break-down and a small amount of fracture extension occurs, the well is shut in and the shut-in pressure determined; the shut-in pressure is an indication of the in situ stress field. This process can be repeated a number of times until the shut-in pressure stabilizes and a better (statistically) value determined. This known technique is outlined by J. D. McLennan and J.-C. Roegiers in SPE 11064 (1982). While the in situ stresses likely play the dominant role in fracture geometry, Young's Modulus and other in situ mechanical characteristics of the formation play a contributing but generally lesser role. Such factors can be determined, if desired, via laboratory core testing using known procedures.

DETAILED DESCRIPTION OF THE INVENTION

The first fluid is a pad fluid. It is used to initiate the fracture. Pad fluids are well known in the art. Aqueous pad fluids are preferably used in this invention. Such aqueous fluids are usually water, light brines, dilute acids, or water thickened with a polymeric viscosifier (e.g. guar, hydroxypropylguar, xanthan gum, polyacrylamide, hydroxyethylcellulose, and the like) or an oil-in-water emulsion containing up to about 5 percent (vol/vol) of a light hydrocarbon (e.g. kerosene, diesel oil, etc.). The pad fluid is selected to be compatible with the second fluid. For example an aqueous pad fluid would usually be chosen over a hydrocarbon-base pad fluid where an aqueous second fluid is to be used.

The second fluid is a novel composition of matter. It comprises a carrier fluid and a bouyant inorganic diverting agent. The second fluid can also contain conventional additives if desired, such as bactericides, clay control agents (e.g. water soluble cationic polymers), fluid loss additives (e.g. silica flour), and the like.

The carrier fluid can be a hydrocarbon-base fluid, but it is preferably an aqueous-base fluid. Such aqueous fluids are usually water, light brines, dilute acids, or water thickened with a polymeric viscosifier (e.g. guar, hydroxypropylguar, xanthan gum, polyacrylamide, hydroxyethylcellulose, and the like) or an oil-in-water emulsion containing up to about 5 percent (vol/vol) of a light hydrocarbon (e.g. kerosene, diesel oil, etc.). The carrier fluid preferably has a viscosity of less than about 20 centipoise at 20° C; in general the more viscous the carrier fluid, the longer it takes for the diverting agent to migrate out of the second fluid after implacement in the fracture (e.g. from a few minutes to a few hours), but this factor is easily determined from a visual observation in single laboratory experiments. Examples of such carrier fluids include: water; 5 weight percent (%) aqueous solutions of guar or hydroxypropylguar, NaCl, KCl, or NH4Cl; aqueous 1%, 5% or 15% HCl; and the like.

The diverting agent used herein is likewise selected from a known class of particulate materials, any one (or mixture) of which can be used herein. Preferred materials are glass or ceramic spheres or beads having a specific gravity less than about 1.0. Glass or ceramic spheres having a specific gravity of from about 0.6 to about 0.7 are most preferred. It is also preferred that the diverting agent has a particle size of from about 70 mesh to about 120 mesh. The diverting agent is subjected to shear during the process as it passes through the pump(s) and piping and injection into the formation. It is also subjected to formation temperatures and elevated pressure during implacement and during the subsequent fracturing treatment. For the diverting agent to perform effectively, it must be essentially inert to the carrier fluid and relatively stable during mixing and injection into the formation and it must remain bouyant throughout the injection process into the formation. This means that the diverting agent must have a crush strength greater than the pressure applied during injection. For example, the glass and ceramic spheres used herein are types of inorganic "ballons" which can be crushed, but generally have about 90-95 percent of original floaters in a given mass of diverting agent in the carrier fluid at atmospheric conditions and have a high percentage (e.g. about 80-85 percent or more) floaters after being subjected to a hydrostatic pressure of about 2000 pounds per square inch (psi).

The amount of diverting agent present in the second fluid can be varied to convenience. Because of the low bulk density of the material, it has been found convenient to blend the second fluid to contain from about 250 to about 1000 pounds of diverting agent for 1000 gallons of fluid, total volume basis, but higher loading levels could be used. The second fluid requires increasing amounts of hydraulic horsepower to pump the fluid at any given rate as the amount of diverting agent increases.

The particulate diverting agent can be blended with the carrier fluid using conventional blending techniques. For example, the diverting agent can be placed into a hopper and fed into a flowing stream of carrier fluid through a solids metering system (e.g. a star-wheel feeder) and pumped through a pressure pump into and through the treatment conduit; the turbulence of the flowing fluid is generally sufficient to keep the diverting agent suspended during the injection process.

The total amount of second fluid injected can be varied to convenience, so long as sufficient diverting agent is implaced to divert subsequently injected fluids downwardly and horizontally and thereby inhibit or prevent the upward growth of a vertical fracture. Amounts of from about one inch or more of the diverting agent generally form an effective barrier zone.

The third fluid is optional in the process. If used, it is selected to be compatible with the second fluid and it is normally injected at essentially the same rate and pressure as the second fluid as a matter of operational convenience. The purpose of using the third fluid is to provide additional time for the diverting agent to migrate upward and form the barrier zone. The composition of this third fluid can be varied but, as noted above, it should be compatible with the second fluid. For example, if the second fluid is an aqueous-base fluid, then the third fluid is advantageously an aqueous-base fluid. As an operational convenience, the third fluid is generally the same composition as the second fluid except without the diverting agent.

After the second fluid (or optional third fluid), a viscous pad fluid and a fracturing fluid are injected at fracture rates and pressure. The compositions of the pad fluid and fracture fluid are conventional. The pad fluid is usually a clear fluid (i.e. without proppant) and is preferably an aqueous-base fluid in the form of a gelled liquid or foam. The fracture fluid is also preferably an aqueous-base fluid. For proppant-bearing fracture fluids, the fluid is usually in the form of a gelled liquid or foam. The gelled liquids usually contain a polymeric gelling agent (e.g. guar, hydroxypropylguar, hydroxyethylcellulose, etc.) in crosslinked or uncrosslinked form. The pH of these fluids can be acid, neutral or basic. For fracture acidizing treatments, which are encompassed in this invention, the fracture fluid is usually a clear liquid (without proppant) in gelled or ungelled form and is usually aqueous hydrochloric (HCl) acid of up to about 28 percent HCl. The selection of volumes, injection rates, and pressures for the pad fluid and fracture fluid are within the skill of the service company engineer designing the fracture treatment. However, it has been found advantageous to inject the viscous pad fluid at gradually increasing rates and pressures (relative to the previous second or third fluid) until fracture rates and pressures are reached. This latter technique seems to protect the barrier zone of diverting agent.

EXPERIMENTAL

A well in the Mancos formation was treated by:

1. Injecting 3000 gallons of a pad fluid consisting of water thickened with 5 weight percent of a polymeric viscosifier (i.e. hydroxypropylguar), hereafter called WF5, at a rate of 7 barrels per minute (BPM) to cause breakdown and establish injectivity.

2. Injecting a second fluid consisting of WF5 with various amounts of certain alumina silicate microspheres. The microspheres had a specific gravity of from about 0.6 to 0.7, a bulk density of about 28 pounds per cubic foot, and 95 percent of the material had a mesh size of from about 70 mesh to about 120 mesh, and at least 95 percent of the material were classified as "original floaters" in the WF5 at atmospheric conditions. This diverting agent also passed the hydraulic stress test with over 85 percent of the microspheres surviving as floaters in hydraulic pressure testing at 2000 psi.

The second fluid was injected in stages: 1000 gallons of fluid containing 250 pounds of diverting agent/1000 gallons (#/1000) of fluid at 7 BPM; 500 gallons of fluid containing 500 #/1000 at 7 BPM and 1500 gallons of fluid containing 1000 #/1000 at 3 BPM.

3. A third fluid, 2000 gallons of WF5, was injected at 3 BPM.

4. A viscous aqueous pad fluid (30,000 gallons) and fracture fluid (52,000 gallons) were then injected at 20 BPM. The pad fluid contained 30,000 pounds of a fluid loss additive (100 mesh sand) in a commercial aqueous base fluid sold by Dowell Division of The Dow Chemical Company under the designation: Dowell "YFCO$_2$", but it contained 135,000 pounds of 20/40 mesh sand as proppant. The proppant was added in stages ranging in concentrations of from 1000 #/1000 initially to 4000 #/1000 in the final 15,000 gallons of the fracture fluid. The Dowell "YFCO$_2$" is an aqueous-base fluid containing a polymeric viscosifier (i.e. guar or hydroxypropylguar) in amounts of about 40 #/1000 (in this treatment) crosslinked with a conventional organo metallic crosslinkers, viscosity breakers, bactericides, etc. and about 25 volume percent of the Dowell "YFCO$_2$" was carbon dioxide (measured as a liquid). After the proppant-bearing fracture fluid, the well was shut in for a period and flowed back in a conventional manner.

What is claimed is:

1. In the method of hydraulically fracturing a subterranean formation penetrated by a wellbore by injecting a fracturing fluid through the wellbore and against the formation at a rate and pressure at least sufficient to initiate and/or extend a fracture into the formation, the improvement comprising: (1) initiating the fracture with a first fluid which is a pad fluid; and (2) extending the fracture with a second fluid comprising a carrier fluid and a bouyant inorganic diverting agent in an amount sufficient to inhibit or prevent the growth of an upward vertical fracture; said second fluid being injected through the wellbore and into the formation at a rate and pressure high enough to extend the fracture and to carry the diverting agent into the fracture but low enough to permit the diverting agent to accumulate in the upper portion of the fracture and form a compacted barrier zone which is capable of diverting subsequently injected fluids downwardly and/or horizontally.

2. The method defined by claim 1 comprising the additional step of further extending the fracture by subsequently injecting a third fluid compatible with said second fluid into said fracture.

3. The method defined by claim 1 comprising the additional step of further extending the fracture by subsequently injecting a proppant-bearing fracturing fluid or acid fracturing fluid into said fracture at fracture rates and pressures.

4. The method defined by claim 2 comprising the additional step of further extending the fracture by subsequently injecting a proppant-bearing fracturing fluid or acid fracturing fluid into said fracture at fracture rates and pressures.

5. The method defined by claim 1 wherein said second fluid is an aqueous-base fluid.

6. The method defined by claim 5 wherein said second fluid comprises a carrier fluid having a viscosity of less than about 20 centipoise at 20° C.

7. The method defined by claim 1 wherein said diverting agent comprises glass or ceramic spheres having a specific gravity less than about 1.0.

8. The method defined by claim 7 wherein said spheres have a specific gravity of from about 0.6 to about 0.7.

9. The method defined by claim 1 wherein said diverting agent has a particle size of from about 70 mesh to about 120 mesh.

10. The method defined by claim 8 wherein said diverting agent is alumina silicate microspheres having a particle size of from about 70 mesh to about 120 mesh.

11. In the method of hydraulically fracturing a subterranean formation penetrated by a wellbore by injecting a fracturing fluid through the wellbore and against the formation at a rate and pressure at least sufficient to initiate and/or extend a fracture into the formation, the improvement comprising: (1) initiating the fracture with a first fluid which is an aqueous pad fluid, (2) extending the fracture with a second fluid comprising (a) an aqueous carrier fluid having a viscosity less than about 20 centipoise at 20° C., and (b) a bouyant inorganic diverting agent having a specific gravity of less than about 1.0, said second fluid being injected through the wellbore and into the formation at a rate and pressure high enough to extend the fracture and to carry the diverting agent into the formation but low enough to permit the diverting agent to accumulate in the upper portion of the fracture and form a compacted barrier zone which is capable of diverting subsequently injected fluids downwardly and/or horizontally, (3) further extending the fracture with an aqueous third fluid which is compatible with said second fluid and is injected at essentially the same rate and pressure as said second fluid, and (4) further extending the fracture by injecting an aqueous proppant-bearing or acid fracturing fluid at fracture rates and pressure.

12. The method defined by claim 11 wherein said carrier fluid is water or an aqueous solution containing up to about 5 weight percent of a polymeric viscosifier, NaCl, KCl, NH$_4$Cl and/or up to about 15 weight percent HCl and wherein said diverting agent comprises glass or ceramic spheres having a specific gravity less than about 1.0.

13. The method defined by claim 12 wherein said diverting agent is alumina silicate microspheres having a specific gravity of from about 0.6 to about 0.7 and a particle size of from about 70 mesh to about 120 mesh.

* * * * *